July 2, 1935.  R. B. FAGEOL  2,006,800
MULTIWHEEL ROAD VEHICLE
Filed Aug. 3, 1929  2 Sheets-Sheet 1
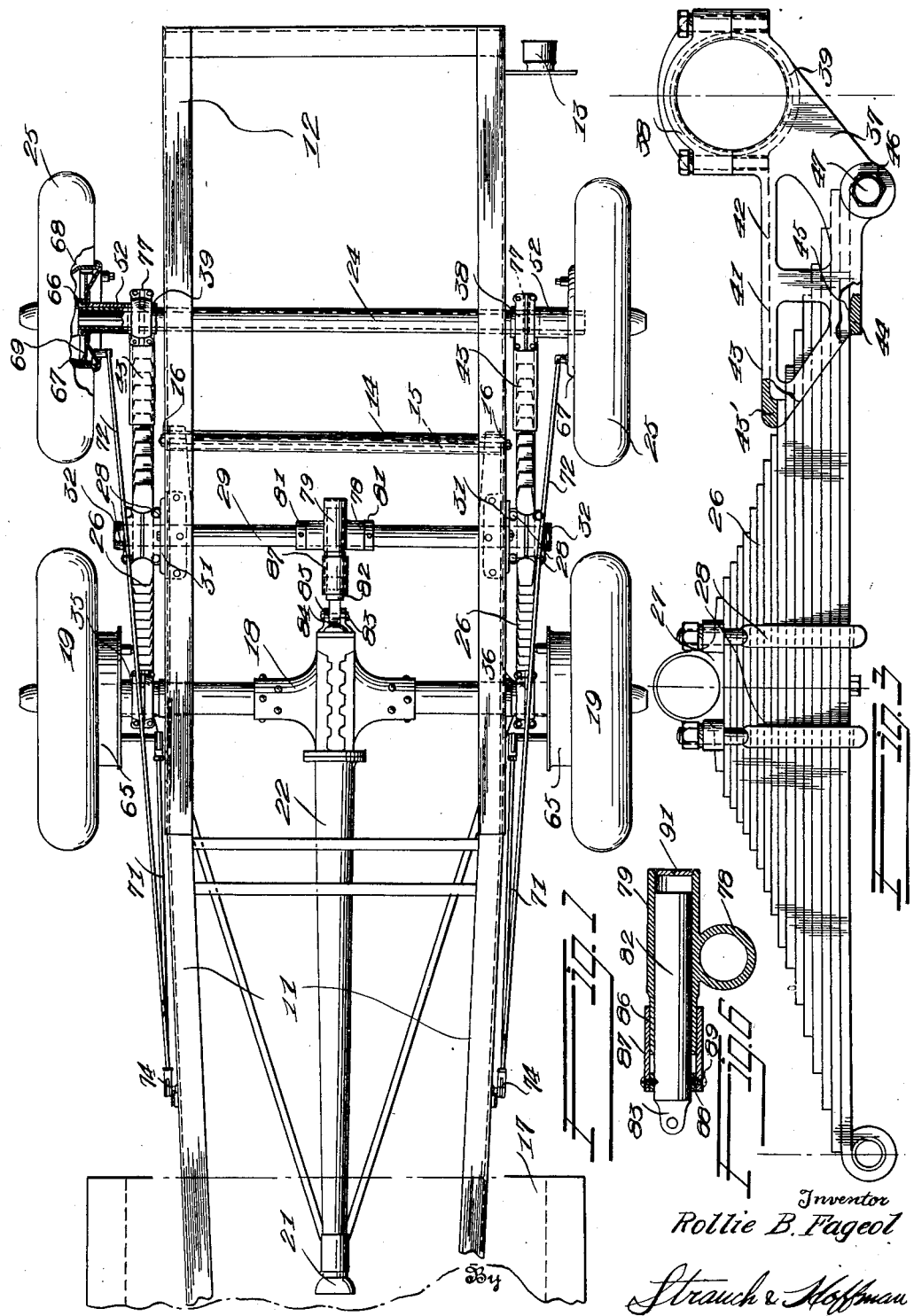
Inventor
Rollie B. Fageol
By Strauch & Hoffman
Attorneys July 2, 1935.  R. B. FAGEOL  2,006,800
MULTIWHEEL ROAD VEHICLE
Filed Aug. 3, 1929  2 Sheets-Sheet 2
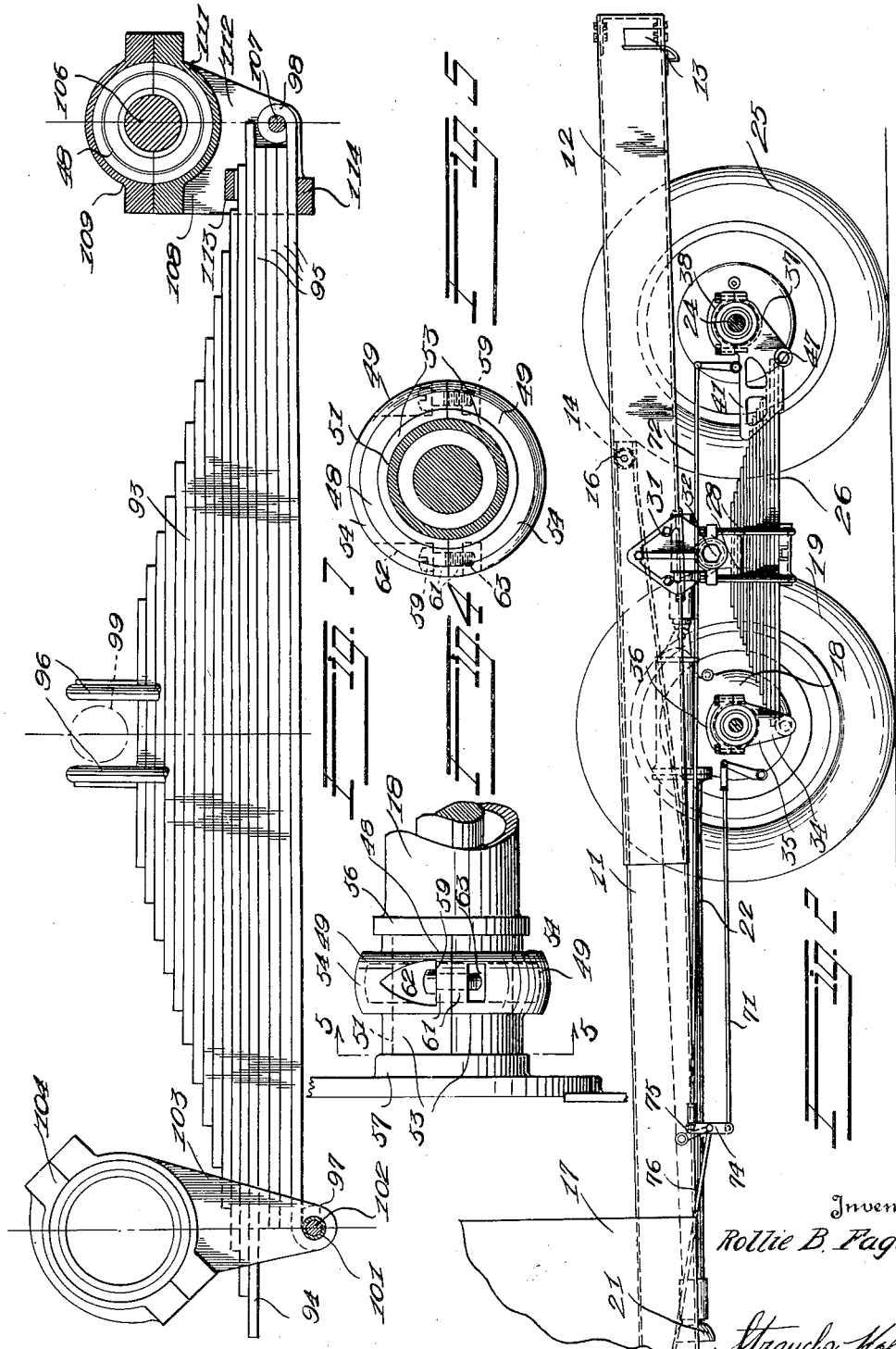
Inventor
Rollie B. Fageol
Strauch & Hoffman
Attorneys Patented July 2, 1935

2,006,800

UNITED STATES PATENT OFFICE 2,006,800

MULTIWHEEL ROAD VEHICLE

Rollie B. Fageol, Los Angeles, Calif., assignor, by mesne assignments, to Automotive Engineering Corporation, a corporation of Delaware Application August 3, 1929, Serial No. 383,414

5 Claims. (Cl. 180—22)

The present invention relates to multi-wheel road vehicles.

More particularly, the invention relates to multi-wheel vehicle constructions, preferably of the type that are constructed from standard vehicles having only a single drive axle by the addition thereto of an extension frame and a non-driven axle. However, the invention is capable of application to new constructions.

Attempts have heretofore been made to fabricate multi-wheel vehicles from standard four-wheel vehicles by the addition thereto of an additional axle and wheels. Most of said attempts have not been entirely successful because either the construction was made too rigid or if adequate flexibility between the parts was provided, difficulties arose from the inadvertent application of the brakes when the wheels moved to a substantial degree within the range of movement permitted by their flexible connection to the frame, and due to uncontrolled movement of certain of the flexibly united parts.

The present invention aims to provide a thoroughly practical multi-wheel road vehicle construction embodying none of the disadvantages just referred to, that may be readily produced by the addition of relatively few and simple parts to a two axle vehicle of standard construction to convert the standard vehicle into a vehicle, one end of which is supported by a truck embodying four wheels. It is highly desirable in converting a standard vehicle of the motor driven type into a motor driven vehicle having a multiplicity of wheels supporting the rear end, that a construction be provided utilizing as many as possible of the standard parts that enter into the construction of the standard vehicle and to so design the construction that the added parts are of relative simplicity and few in number, without thereby in any manner sacrificing the advantages that are secured by a properly constructed multi-wheel road vehicle.

A primary object of the present invention is to provide a multi-wheel road vehicle construction in which a plurality of pairs of wheels are utilized to support one end of the vehicle frame, in which the wheels are connected together and to the frame in a manner to provide for individual movement thereof in response to road irregularities with a minimum of strain on the brake and other connections between the wheels and vehicle frame.

A further object of the invention is to provide a multi-wheel road vehicle construction, including a pair of driven wheels, and a pair of non-driven wheels that are interconnected to provide a truck construction, said truck construction pivotally supported by the vehicle frame for oscillation relative thereto, said truck construction embodying standard vehicle springs and pivotally supported by the vehicle frame in a manner such that the greater portion of the weight of the vehicle and load carried thereby is borne by said driven wheels.

A still further object of the invention is to provide a multi-wheel road vehicle including a flexible truck construction comprising axles connected to the springs by depending hangers connected to the axles by universal joints, and including a connection between the frame and an axle to restrict relative lateral movement between said axle and said frame without otherwise interfering with the free movement of said axle permitted by its connection to said frame.

A still further object of the invention is to provide a multi-wheel road vehicle construction fabricated from a standard four-wheel vehicle and embodying a driven axle and a non-driven axle provided with driven and non-driven wheels respectively, said axles yieldably connected together by standard spring constructions, said spring constructions pivotally connected to the vehicle frame in a manner such that said driven wheels support the major portion of the load.

A still further object of the invention is to provide a multi-wheel road vehicle by the addition of relatively few and simple parts to a standard four-wheel vehicle or truck, said parts comprising an extension frame, a non-driven axle provided with a pair of wheels, a trunnion shaft supported by said extension frame, and spring hangers movably supported by said non-driven axle whereby said non-driven axle is readily connected with said drive axle by standard spring assemblies which spring assemblies are pivotally connected to said trunnion shaft, said spring hangers spacing said non-driven axle from said trunnion shaft a substantially greater distance than that of said drive axle from said trunnion shaft whereby the greater portion of the load is borne by said drive axle.

A still further object of the invention is to provide a multi-wheel road vehicle comprising a pair of axles supported by brake equipped wheels, said axles yieldably and pivotally connected to the frame of said vehicle for vertical oscillation relative thereto, and brake connections to said brakes that not only equalize the braking forces but at the same time permit independent oscillation of the wheels without the respective brakes becoming set due to such movement.

A still further object of the invention is to provide a multi-wheel road vehicle constructed with standard parts from a four-wheel vehicle in which simple means are provided to make it possible to utilize such parts without substantial modification.

Still further objects of the invention will appear as a description thereof proceeds with reference to the accompanying drawings, and wherein:—

Figure 1 is a plan view of the rear portion of the chassis of a multi-wheel road vehicle constructed in accordance with a preferred embodiment of the invention.

Figure 2 is a vertical longitudinal sectional view taken on a plane cutting the axles immediately adjacent the wheels on one side thereof.

Figure 3 is a side elevational view, partially in vertical section of a standard Ford spring assembly shown in operative relation with a ball hanger embodied in the present invention.

Figure 4 is a broken side elevational view of the drive axle housing showing the association therewith of a ball hanger seat embodied in the present invention.

Figure 5 is a transverse sectional view on a plane represented by line 5—5 in Figure 4.

Figure 6 is a longitudinal sectional view of a device embodied in the present invention for flexibly connecting the drive axle with the vehicle frame for holding the axle centrally of the frame.

Figure 7 is a broken side elevational view, partially in section of a standard Chevrolet spring assembly altered in accordance with a modified embodiment of the invention.

The novel vehicle construction about to be described, is particularly intended to be fabricated from an ordinary road vehicle of the motor driven type, in which the rear end thereof is supported on a single axle carried by a single pair of wheels. Standard vehicles of the character just referred to may in accordance with the present invention, be readily converted into multi-wheel road vehicles with their attendant advantages by the addition thereto of relatively few simple parts about to be described. It should be understood, however, that the invention may be embodied in a vehicle that is constructed de novo, rather than by simply converting a standard construction or adding an attachment to such a structure.

In the drawings, the numeral 11 designates the chassis frame of an ordinary standard vehicle which is to be converted in the manner presently to be described into a multi-wheel road vehicle having a substantially longer wheel base. This longer wheel base is, preferably, secured by attaching to frame 11 an extension frame 12 which, as indicated, is disposed in lapped relation to frame 11 and secured thereto in any desired manner.

Upon attaching the extension frame 12 to frame 11, the license plate, tail light, etc., are moved to the rear of the extension frame 12, as indicated at 13, and in order to reinforce the thus provided extended frame and hold the opposite sides thereof in rigid spaced relation, a tube 14 is disposed transversely between opposite sides of the frame with the opposite ends thereof engaging the inner faces of the opposite side members of the frame adjacent the rear end of the main frame 11 as indicated in Figures 1 and 2. A rod 15 is extended through tube 14 and the opposite side frame members and nuts 16 are threadedly engaged with opposite ends of rod 15 and drawn into engagement with the outer faces of the frame side member thus drawing the opposite ends of tube 14 into tight engagement with the frame side members.

The forward end of frame 11 is supported by a front axle (not shown) in the usual manner and the front end of the vehicle including the cab 17 is of usual construction.

Disposed adjacent the rear end of frame 11 is drive axle housing 18, containing a drive axle and differential of well known form which in the fabrication of the multi-wheel constructions assumes its original position relative to frame 11, the housing 18 containing the usual live axle sections operatively connected to the standard drive wheels 19. The axle sections are differentially driven by the differential mechanism within housing 18 to which mechanism the rear end of the usual drive shaft is operatively connected, the forward end of the drive shaft being provided with the usual universal joint within the universal joint 21 of the axle housing torque resisting tube 22 whose rear end is fixed to housing 18. The tube 22 is connected to the frame adjacent its forward end by the universal joint 21 in known manner.

The vehicle construction from which the multi-wheel vehicle is constructed may be of any desired make, the one illustrated being a standard "Ford" vehicle construction which in accordance with the present invention is to be converted into a novel multi-wheel road vehicle construction.

The present invention preferably embodies a non-driven or dead axle 24 supported by wheels 25. The axle 24 is connected with axle 18 rearwardly thereof and to the vehicle frame by the utilization of the standard spring assemblies 26 which in the standard construction yieldably connected axle housing 18 with frame 11, the spring assemblies 26 being associated in this construction with axles 18 and 24 and the vehicle frame in a novel manner about to be described for providing a construction of required stability and great flexibility and which permits movement of the wheels 19 and 25 occasioned by road irregularities without undue strain on the connecting parts, such as the brake connections. The spring assemblies 26 are pivotally secured, centrally of the lengths thereof, by means of eye-members 27 disposed between the spring leaf securing U-bolts 28, to the opposite projecting ends of a transversely disposed trunnion shaft 29, which shaft is supported adjacent the projecting ends thereof in brackets 31 secured to the opposite sides of frame extension 12, the spring pivot members 27 being maintained on shaft 29 by means of nuts 32 engaging the opposite threaded ends of the shaft. The opposite ends of the spring assemblies 26 in the above described pivotal connection with the vehicle frame are disposed substantially below the axles 18 and 24, as clearly indicated in Figure 2, and said ends are connected with the axles 18 and 24 by novel ball hanger constructions about to be described.

The forward ends of the spring assemblies are connected to axle housing 18 by means of ball hangers or stirrups 34 each comprising a body portion 35 and a cap portion 36, the ball hangers 34 having a universal connection with ball seats, hereinafter described, for permitting vertical universal oscillation of the opposite ends of axle 18 without undue strain in the spring assemblies 26. The opposite or rear ends of the spring assemblies 26 are connected with axle 24 in a similar manner, the hangers 37 for these ends of the springs comprising cap portions 38 and body portions 39, which include longitudinal extensions or shoes 41 in order to dispose axle 24 at a greater distance from trunnion shaft 29 than that of axle 18, while utilizing the standard Ford spring assemblies for a purpose later described.

The extension 41 of each of the hangers 37 comprises laterally spaced skeleton side plates 42 the inner faces of which are spaced apart substantially a distance equal to the width of springs 26, the plates 42 being integral with body portion 39 and a top cover portion 43. The plates 42 are open at the front ends thereof between cover portion 43 and an integral transverse base bar 44 provided with an arcuate outer face 45. Plates 42 are provided with transversely alined apertured ears 46 in which is disposed a pintle 47 for engagement through the eye of the adjacent end of spring 26 for pivotally connecting the spring with the plates 42.

As is clearly indicated in Figure 3 the rear ends of springs 26 project between side plates 42 with the respective eyes pivotally connected to pintles 47 and with the outer face of one leaf in engagement with the inner face of a thickened end portion 43' of cover 43, and the inner leaf in sliding and rocking engagement with the arcuate face 45 of bar 44, whereby the rear ends of springs 26 are not only connected with axle 24 for universal movement relative thereto but a flexing connection is provided between springs 26 and hangers 37 about pintle 47. The flexure of the joint thus provided is yieldably limited by the portions 43' and 44, the former action to limit the flexure in one direction and the latter in the other. The axle 24 is thus positioned endwise with respect to the frame without markedly restricting its freedom to rise and fall as the wheels that support it pass over road irregularities. At the same time the spacing of the axle 24 from the trunnion shaft 29 a distance greater than half the length of the spring is accomplished. Thus symmetrical springs can be used and it is unnecessary to supply special constructions.

The extensions 41 are preferably of such length that the relative spaced distances of axles 18 and 24 from trunnion shaft 29 will be such that approximately 60% of the load will be borne by the drive wheels 19 and 40% by the non-driven wheels 25, this unequal distribution of the load being provided for insuring effective traction for the wheels 19.

The ball hanger seats are removably secured to axles 18 and 24 immediately outward of the opposite sides of the vehicle frame, as indicated in Figure 1, and while the hangers 34 and 37 have a universal pivotal connection with the ball seats, the seats in accordance with the present invention are preferably constructed for rotatable journalled connection with the axles, whereby the mating half sections of the seats may always be secured in abutting relation on varying diameter axles for providing a uniform dimension of external ball surface. The ball seats 48, in accordance with the present invention (one of which is illustrated in detail in Figures 4 and 5) preferably each comprises a pair of mating sections 49 adapted for journalled connection with the cylindrical seat 51 on housing 18, or a similar seat on each of the sleeves 52 disposed on the opposite ends of the cylindrical axle 24 with the adjacent plane faces of the sections 49 in engagement as illustrated in Figures 4 and 5.

Each of the ball seat sections 49 comprises a semi-cylindrical bearing portion 53 and a hollow ball or spherical surfaced portion 54 of substantially less width than the length of portion 53 and of substantially greater diameter than portion 53, the portion 53 being disposed between collars or flanges 56 and 57 on housing 18 or similar flanges on sleeves 52 and the portion 54, particularly on the axle housing 18 being disposed in off-center relation to bearing portion 53 in order to provide sufficient clearance for swinging movement for hangers 34 toward the brake drums on wheels 19 without engaging said drums.

In order to secure the sections 49 of seats 48 in engagement and obviate any danger of injury to the hangers supported on the seats in the event of displacement of the section securing means, each pair of sections 49 are preferably secured into contacting engagement by a pair of diametrically disposed bolts 59 detachably engaged in mating apertures in flanges 61 of sections 49 which flanges are defined by cutting sections 49 back as indicated at 62 and 63 whereby bolts 59 are disposed substantially inwardly of the ball surfaces of sections 49 thereby substantially minimizing danger of contact between the bolts and the bearing surfaces of the hangers in the event bolts 59 become loosened.

By the construction just described, it will be seen that a truck is provided for supporting the rear portion of the extended frame, the truck embodying a standard drive axle and an additional dead axle, which axles are interconnected by standard spring constructions which have a pivotal connection with the vehicle frame in a manner such that the major portion of the weight is supported by said drive axle. It will be further seen that by the provision of the ball hangers 34 and 37 that the spring assemblies are connected with the axles by universal connections whereby either end of either axle may be elevated or depressed with respect to the opposite end in response to road irregularities without imposing undue strains in the springs secured thereto, and by suspending the springs from the axles 18 and 24 by the hangers 34 and 37 in the manner disclosed the load carried by the vehicle is transferred to the axles through the depending hangers thus providing a substantially stable construction without in any way impairing the flexibility thereof. The axle 18 is positioned by torque tube 22 while the axle 24 is positioned by the springs and hangers 37. The springs merely yieldingly resist the movement of the drive axle.

The wheels 19 are provided with standard brake constructions 65 and the wheels 25 which are rotatably journaled on axle 24 by ball bearing assemblies 66 are provided with brake constructions 67. While axle 24 and wheels 25 may be of any desired construction the axle 24 preferably comprises a tubular member, as illustrated in Figure 1, on the opposite ends of which, outwardly of the opposite sides of extension frame 12, the sleeves 52 are secured. The wheels 25 include brake drums 68 as a part of the wheel construction and with which brake drums are associated brakes 69 which in the present instance are the Ford model "A" rear brakes which may be installed at relatively small expense. The wheels 25 which comprise part of the attachment may be standard wheels and as illustrated are preferably provided with smaller tires than wheels 19 thus reducing the expense of the attachment and wheels 25 support but a fractional portion of the load relatively large tires are unnecessary.

The brake constructions 65 are operable through brake rods 71 at opposite sides of the frame and the brake constructions 67 are operable by rods 72 at opposite sides of the frame. In order to provide an equal pull on rods 71 and 72 on each side of the frame, as well as to prevent setting of the brakes on any particular wheel upon rising or falling thereof, an equalizer bar or link 74 is pivotally connected intermediate its ends to the usual brake lever 75 at each side of the frame which levers 75 may be, as in common practice, operable by a pedal operated brake rod 76. The rods 71 and 72 at each side of the frame are pivotally connected at the forward ends thereof to the opposite ends of link 74 at points equidistant from the central pivotal connection of said link. Thus it will be seen that upon forward movement of levers 75 induced by rod 76 the pull will be equalized on rods 71 and 72 and it will be further seen that due to this construction rods 71 and 72 are free to move lengthwise thereof as the wheels move relative to each other, thus preventing the setting of any brake or brakes upon vertical oscillation of the opposite ends of the axles in response to road irregularities. The rods 71 and 72 are long so that the arc of movement of the ends thereof where attached to the brakes approaches a straight line.

Upon setting brakes 65 the torque reactions will be resistant by the torque tube 22, but as axle 24 is secured to the frame only by springs 26 means are provided for resisting the brake torque reactions on wheels 25. Such means preferably comprising a pin 77 extended through each of the ball seats on the tubular axle 24 as well as through the axle itself. If desired, the pin extends through the ball hanger at one side only whereby the axle and hangers are restrained against rotation about the longitudinal axis of axle 24 without restricting the universal action between the hangers and ball seats at the other side of the frame.

While it is desirable and in fact necessary, for most effective operation that the drive axle 18 be permitted vertical oscillation about the universal joint 21 as well as movement in the vertical plane of its axis, also permitted by the universal joint 21, it is necessary that the drive axle 18 be maintained centrally of the vehicle frame, the axle having a tendency upon rounding curves as well as upon side impact to be moved against the limited restraining action of its flexible connections to springs 26 from its central position relative to the vehicle frame.

The present invention comprises means for holding axle 18 centrally of the vehicle frame without rendering the construction as a whole inflexible. Said means, in a preferred embodiment thereof, comprises a unitary member comprising intersecting tubular members 78 and 79 which members, as indicated in Figures 1 and 6, are vertically offset. The tubular member 78 is adapted for rotative movement on trunnion shaft 29 between collars 81 suitably fixed to shaft 29 and tubular member 79 has reciprocably and revolvably mounted therein a plunger 82 which projects substantially forwardly of tubular member 79 and is provided on the forward end thereof with an apertured ear 83 for disposition between similarly apertured ears 84 integral with housing 18. Ears 83 and 84 are pivotally connected together by a pintle pin 85. The forward end of member 79 is reduced as indicated at 86, on which reduced portion is slidably disposed the rear end portion of a tubular joint sealing member 87 the forward end of which is secured to plunger 82 by means of a filler ring 88 and screws 89 which extend through member 86, ring 88 and into plunger 82.

The tubular member 87 together with ring 88 provides a moisture and dust proof seal for the joint between member 79 and plunger 82 and as a means for detachably closing the rear end of tubular member 79 an externally threaded plug 91 is removably secured therein as indicated in Figure 6.

In accordance with the construction just described axle 18 is permitted to rise and fall about joint 21 through the rotation of member 78 on shaft 29 and the pivotal connection 85 between axle 18 and plunger 82 and as plunger 82 is free for rotation within member 79 axle 18 is permitted angular movements in the vertical plane of its longitudinal axis, but the construction positively restricts movement of axle 18 laterally of the frame and parallel to shaft 29 thus maintaining the axle 18 centrally of the frame without in any way substantially restricting the necessary movements thereof for most effective operation.

From the foregoing disclosure it will be seen that a multi-wheel vehicle construction is provided embodying a two-axle construction for supporting the rear end of the vehicle frame, which construction comprises a driven axle and a non-driven axle having a universal connection with depending hangers attached to the opposite ends of spring assemblies, which spring assemblies are supported in suspension from said axles and have a pivotal connection intermediate said axles with the vehicle frame so that the axis of said connection under normal load conditions may lie in the horizontal plane that contains the axes of the several axles. Thus movement of the frame in a fore and aft direction is minimized.

While the construction disclosed is applicable in original multi-wheel road vehcle constructions it is particularly adapted to the construction of such vehicles by the addition to standard vehicle constructions embodying a single drive axle of an attachment embodying the frame extension 12, axle 24, wheels 25 and inter-connecting the axle 24 and standard drive axle 18 by the standard spring assemblies 26 and pivotally connecting the spring assemblies 26 to a trunnion shaft 29 disposed transversely of and secured to extension frame 12 and by securing the ends of the spring assemblies to axles 18 and 24 by ball hangers for providing a universal flexible connection between the spring assemblies and axles and by the provision of extensions 41 on hangers 37 associated with axle 24, the axle 24 is spaced at a greater distance than axle 18 from the trunnion shaft 29 whereby the load is unequally distributed on axles 18 and 24 with sufficient weight on the drive wheels 19 to provide effective traction.

It will readily be seen from the foregoing detailed disclosure that the present invention provides a relatively simple and inexpensive attachment whereby a standard vehicle construction can readily be converted into a multi-wheel vehicle construction at relatively little cost, it being only necessary to provide axle 24 with wheels 25 (which may be standard constructions), frame extension 12, trunnion shaft 29 and securing brackets therefor, ball hangers and the drive axle centering means.

While the novel multi-wheel road vehicle construction is illustrated as having been fabricated from a standard Ford vehicle, the invention is not thus limited, many phases of the invention being applicable to other standard makes of vehicle constructions by corresponding slight changes in elements entering into the attachment construction. Thus a standard Chevrolet vehicle construction is in accordance with the present invention, adapted for ready conversion into a multi-wheel road vehicle of the character above disclosed. In making this adaptation, the standard Chevrolet springs 93, illustrated in Figure 7, are slightly altered for use in the Chevrolet multi-wheel construction similarly to the Ford spring constructions 26.

In the application of the present invention to standard Chevrolet vehicles for the conversion thereof into multi-wheel vehicles of the character above referred to with a corresponding wheel base, the standard Chevrolet springs 93 are utilized for connecting the drive and dead axles corresponding to axles 18 and 24, and springs 93 are pivotally connected to a trunnion shaft corresponding to shaft 29 with the drive and dead axles spaced apart the same distance as axles 18 and 24 and with the pivotal points of connection of springs 93 with the vehicle frame at spaced distances from the drive and dead axles corresponding to the distances of the pivotal connections of springs 26 from axles 18 and 24. Due to the substantally greater length of the Chevrolet springs 93 than the Ford springs 26, the standard Chevrolet springs 93 in the utilization thereof in the fabrication of multi-wheel constructions have the eyes on the longer leaves 94 removed and in order to provide for greater strength four additional and substantially shorter spring leaves 95 are added as indicated in Figure 7 and correspondingly longer U-bolts 96 are utilized for holding the original and added spring leaves 95 in contact.

The forward end of the lower leaf 95 of each spring is turned downwardly for providing a downwardly directed eye 97 and the opposite end of the same leaf is turned upwardly for providing an upwardly directed eye 98.

The eyes 97 are disposed at a distance from the pivotal connections 99 of the springs corresponding to the distance of the forward eyes on springs 26 from the pivotal connections of springs 26 with shaft 29 and eyes 97 are provided with bushings 101 in which standard Chevrolet pivot pins 102 are disposed for pivotally connecting the forward ends of the modified springs to the lower ends of ball hangers 103 which hangers are formed for co-operation with the presently used caps 104, the hangers 103 and caps 104 cooperating with ball seats similar to seats 48 for providing universal connections between the forward ends of the springs and the drive axle.

The eyes 98 of the modified springs are disposed at a distance from pivotal connection 99 corresponding to the distance of the rear eyes on springs 26 from the pivotal connections of springs 26 with shaft 29 with the centers of eyes 98 in vertical alinement with the axis of a dead axle 106. The axle 106 is provided with journalled hanger seats 48 and spring eyes 98 are pivotally connected by standard Chevrolet spring pins 107 to the inner ends of special ball hangers 108 which cooperate with the standard caps 109 for providing a universal connection between the hangers and axle 106.

Each hanger 108 comprises a ball seating portion 111 integral with which is a pair of vertically disposed plates 112 spaced laterally a distance substantially equal to the width of the spring leaves and through which pins 107 extend.

Plates 112 are integrally connected by transverse bars 113 and 114 adjacent the front edges of plates 112 which bars are vertically spaced for providing a guide opening between plates 112 for the rear ends of the modified spring assemblies.

Thus by this construction of hangers the springs are not only pivotally connected thereto by pins 107 but a yielding action is provided by means of bars 113 and 114 between the springs and hangers 108 for the purposes above described with reference to brackets 37.

Suitable equivalent means may be provided in the construction just described for locating the forward or drive axle endwise with respect to the frame, to take the place of the inextensible torque tube 22, when a Hotchkiss drive is employed as is customary in Chevrolet vehicles. Radius rods may be used or if an extensible tube is used the relatively movable parts may be welded or suitably secured together to convert a four wheel vehicle into a flexible multi-wheel construction of the type herein disclosed.

While I have disclosed my present invention in relation to standard Ford and Chevrolet vehicle constructions, it is to be understood that the invention is equally applicable to other types of standard vehicle constructions for the ready conversion thereof into novel multi-wheel road vehicle constructions of the general character herein disclosed, and that the invention is also equally applicable in new vehicle constructions.

While I have disclosed but a single specific embodiment of my invention, such specific disclosure is to be considered as illustrative only and not restrictive, since the scope of the invention is defined by the sub-joined claims rather than by the foregoing specific disclosure.

What I claim as new and desire to secure by United States Letters Patent is:—

1. A multi-wheel road vehicle comprising a frame; a pair of axles arranged to support one end of the frame; a pair of springs to mount said frame upon the axles, said springs being pivoted between their ends to said frame adjacent each side thereof; brackets to universally connect the ends of the springs to the ends of the axles, certain of said brackets being designed to position one axle substantially beyond the ends of the springs to which it is connected, and all of said brackets being arranged to depend lower than the axes of the axles so that the horizontal plane containing said axes is positioned relatively close to the axes of the spring pivots.

2. A multi-wheel road vehicle comprising a frame; a pair of axles arranged to support one end of said frame; a pair of springs to mount said frame upon said axles, said springs being pivoted between their ends to said frame adjacent each side thereof and each having one end supported by one of said axles; brackets to universally connect the other ends of said springs to the ends of the other axle, said brackets being designed to position said last mentioned axle substantially beyond the spring ends to which it is connected, and arranged to depend below said last mentioned axle substantially; and means on said brackets contacting with the upper and lower surfaces of said springs to restrict the movement of said last mentioned axle with respect to spring ends connected thereto.

3. In a suspension and load equalizing system for vehicles, a frame, tandem pairs of wheels for supporting the frame, axles for the wheels, at least one of which is power driven, a bracket secured to the frame on each side thereof intermediate adjacent wheels, a laminated leaf spring adapted to function as an equalizing lever pivotally connected intermediate its ends to each of the brackets, a shackle connecting one end of the spring to one of the axles, a shoe on the other end of the spring, a stirrup on the shoe embracing the other axle, and bearing means between the stirrup and said axle and designed to permit freedom of axle movement without imposition of destructive stresses on the shoe and stirrup.

4. In a suspension and load equalizing system for vehicles, a frame, tandem pairs of wheels for supporting the frame, axles for the wheels, at least one of which is power driven, a bracket secured to the frame on each side thereof intermediate adjacent wheels, a laminated leaf spring adapted to function as an equalizing lever pivotally connected intermediate its ends to each of the brackets and having one of its ends supported by one of the axles, a shoe receiving and surrounding the other end of the spring, and means carried by the shoe for embracing the other axle and provided with a connection permitting tilting of said other axle without distortion of the springs.

5. For use in combination with a vehicle framework, a pair of tandem axles arranged beneath said framework; and a suspension at each side of said framework; each suspension comprising a longitudinal spring means pivoted between its ends on the framework and having its ends projecting into proximity to the corresponding ends of said axles and supported thereby, a shoe structure entirely spaced from the spring pivot and telescopingly receiving one of said spring ends, means carried by said shoe structure for flexible connection with the corresponding axle end to permit tilting of the axle without spring distortion, and said structure having portions disposed respectively above and below said spring end to prevent relative vertical swinging movement between said spring end and the shoe structure.

ROLLIE B. FAGEOL.